United States Patent

[11] 3,629,613

[72] Inventor Edgar P. Feige
Chester, Pa.

[21] Appl. No. 77,298

[22] Filed Oct. 1, 1970

[45] Patented Dec. 21, 1971

[73] Assignee General Electric Company
Philadelphia, Pa.

[54] COMMUTATION DIRECTION CIRCUIT
5 Claims, 3 Drawing Figs.

[52] U.S. Cl. .......... 307/252 Q, 307/252 M, 307/252 T, 317/33 SC

[51] Int. Cl. .......... H03k 17/00

[50] Field of Search .......... 307/252 M, 252 T, 252 Q, 252 B, 305; 317/33 SC, 31; 321/5; 318/227; 340/252 E, 252 Y

[56] References Cited

UNITED STATES PATENTS

| | | | |
|---|---|---|---|
| 3,462,619 | 8/1969 | Grees | 307/252 Q |
| 3,558,983 | 1/1971 | Steen | 317/33 SC |
| 3,098,949 | 7/1963 | Goldberg | 317/31 |
| 3,450,894 | 6/1969 | Pollard | 307/252 Q |

*Primary Examiner*—Donald D. Forrer
*Assistant Examiner*—David M. Carter
*Attorneys*—J. Wesley Haubner, Barry A. Stein, Frank L. Neuhauser, Oscar B. Waddell and Joseph B. Forman

ABSTRACT: Disclosed is means for insuring proper commutation in an inverse parallel connected power thyristor switch. The switch includes selectively operable commutation means for interrupting a fault current in rapid response to a stop signal from an overcurrent detector, polarity detecting means which determine direction of current flow through the switch and control means operative in response to the polarity detector means which enables the stop signal to actuate the commutation means associated with the fault current conducting thyristor. Further, means are provided to ensure that the stop signal once given quickly terminates.

INVENTOR:
EDGAR P. FEIGE,
BY Barry A. Stein
ATTORNEY

INVENTOR:
EDGAR P. FEIGE,
BY Barry A. Stein
ATTORNEY

INVENTOR:
EDGAR P. FEIGE
BY Barry G. Stein
ATTORNEY

COMMUTATION DIRECTION CIRCUIT

BACKGROUND AND OBJECTS OF THE INVENTION

This invention relates to forced commutated static switches which are adapted to be connected in electric power circuits for selectively permitting or blocking the flow of alternating current therein. More particularly, this invention relates to a combination of an AC thyristor switch—including commutation circuits operative for interrupting current through the switch and means for operating selected commutation circuits in response to a sensed abnormality—and novel means for preventing unselected commutation circuits from operating once commutation by the selected commutation circuits has begun.

In the art of electric power distribution and utilization, it is a common practice to employ switches or circuit breakers in order to initiate or terminate the flow of load current on command from a control circuit. These switches may advantageously be constructed of solid-state controllable switching devices such as thyristors. A silicon-controlled rectifier (SCR) is one type of thyristor useful in such switches. Since thyristor switches do not utilize any moving parts for circuit completion or interruption, they are known in the art as static switches. Static switches may be provided with overcurrent protective means to enable them to interrupt the flow of load current in response to a sensed overcurrent of a preselected magnitude.

As is well known, an SCR comprises a body of semiconductor material having a plurality of layers of alternately P- and N-type conductivities which form a plurality of back-to-back rectifying junctions therein. The semiconductor body is disposed between a pair of main electrodes, one known as the anode and the other as the cathode. Thyristors additionally include some form of gating means (e.g., in a conventional SCR it is the gate electrode) which is operative for initiating current conduction between the anode and cathode. When connected to a source of voltage and a load, an SCR will ordinarily block appreciable current flow between its anode and cathode until triggered or fired by a signal to its gate electrode at a time when its anode is biased positive with respect to its cathode, whereupon it abruptly switches to a relatively low resistance conductive state. Once conducting, the SCR will continue to conduct load current even if no further triggering is provided, so long as the magnitude of current is above a predetermined holding level. When the magnitude of current drops below that level, the SCR switches to a relatively high resistance state whereupon the flow of load current is blocked until the SCR is subsequently retriggered. Therefore when connected to an AC power source an SCR will necessarily cease conducting at the occurrence of a natural current zero.

SCR's are unidirectional controlled switches, therefore, in an AC power distribution system they are normally connected in an inverse parallel configuration to form the static switch in order that both the positive and negative half cycles of the source voltage can be supplied to the load. A control circuit is normally provided for supplying gate signals to the switch or power SCR's to initiate conduction therein. The control circuit may include means for effectuating load current interruption in response to a sensed overcurrent. This may be accomplished by stopping the supply of trigger signals from the control circuit, whereupon the switch or power thyristors would commence blocking load current at the occurrence of the next natural current zero. It should be noted that this manner of current interruption may allow the fault current to build up to dangerous levels before the conducting switch regains its blocking state since interruption can only occur at the current zero following the fault current's detection.

In order to provide current interruption capability within a fraction of a half cycle of the alternating source voltage, means must be provided to force the conducting power SCR off (i.e., return it to its blocking state). The process of turning off a conducting power SCR is known in the art as forced commutation, or simply commutation. A static switch equipped with commutation means for interrupting load currents within a fraction of a half cycle of the detection of a fault is known as a current-limiting switch. Such a switch limits the magnitude of fault current to an acceptable maximum by interrupting the fault current early in its half cycle (i.e., before it reaches its available peak magnitude).

The commutating means can take a variety of forms which are well known in the art. One commonly used commutation circuit comprises a charged capacitor connected in series with a thyristor (the thyristor is known in the art as a commutating thyristor, and the capacitor is known as a commutating capacitor). This circuit is connected in shunt across the power SCR of the static switch. The commutating thyristor is poled in the same direction as the power SCR and is normally in the nonconductive state. The commutating capacitor is charged to a predetermined DC voltage in opposition to the polarity of the power thyristor and is isolated from the power thyristor by the nonconducting commutating thyristor. When a fault current whose magnitude exceeds a preselected level is detected flowing through the system, the commutating thyristor is triggered on by its control circuit. This allows the charged commutating capacitor to discharge in the reverse direction through the conducting power thyristor. The commutating capacitor discharge serves to reverse bias the power thyristor and drive the current flowing through it below its holding level, whereupon it turns off (resumes its blocking state).

In an AC static switch, comprising a pair of power SCR's connected in inverse parallel relationship with one another, a separate commutation circuit is connected in shunt across each SCR of the switch. Accordingly, the commutation circuit shunting one SCR will necessarily form a series path or loop with the commutation circuit shunting the inversely poled SCR. Since the capacitor in each commutation circuit is charged to a polarity in opposition to the SCR it shunts, if the commutation thyristors of both commutation circuits are simultaneously triggered the energy stored in the capacitor shunting the then nonconducting SCR will act to forward bias the conducting SCR while the energy stored in the other capacitor is trying to reverse bias it. The net effect of this action may impede proper commutation.

In order to minimize the forward bias effect of the discharge of the commutation capacitor shunting the nonconducting SCR when the commutation circuits are simultaneously actuated, it was previously proposed, in U.S. Pat. application Ser. No. 738,611 filed on June 20, 1968, for Floyd L. Steen and assigned to the same assignee as this invention, to use decoupling inductors connected between each power SCR and the source end of the switch. In certain high-power applications the provision of such inductors may not be entirely satisfactory as an economical means of ensuring proper commutation.

In a copending application Ser. No. (48LVOO537) assigned to the same assignee of this invention, there is disclosed and claimed a novel circuit for selectively controlling the commutation circuits of a three-phase AC static current limiting switch so that the undiminished energy stored in the capacitors associated with the conducting power SCR's is available to reverse bias them off. To accomplish this result, a level sensitive polarity detector is utilized to determine the polarity of the current flowing through each phase of the switch. That detector supplies signals indicative of the current's direction to a control means which responds thereto by directing a fault current induced signal (referred to as a "Stop" signal) to the trigger means for the commutation circuit associated with the conducting power SCR to actuate that means while preventing the "Stop" signal from actuating the trigger means for the commutation circuit associated with the inversely poled power SCR. As was noted therein, the polarity detector looses its directional discrimination when the current flowing through the associated phase is less than a certain low value, at which time neither triggering means for the commutation circuits of that phase is disabled.

In a three-phase switch it is possible to have fault currents flowing in all phases simultaneously. As soon as the fault current in any one of the phases attains a preselected trip level, stop signals are provided to actuate the trigger means for the commutating thyristors associated with any then conducting power SCR. Once actuated, the trigger means renders the commutating thyristor conductive whereupon its associated commutating capacitor begins discharging in the reverse direction through the conducting power SCR. This action drives the fault current in each phase to zero. Once the magnitude of current in any phase falls below the threshold level of its polarity detector, both trigger means associated therewith are enabled for actuation. I have found that if the fault current flowing in one phase is above the switch's trip level (so that a Stop signal is provided) while the current in another phase is driven below the threshold level of its polarity detector, the previously untriggered commutating thyristor in the latter phase may become conductive when forward biased by the reversal of polarity of the applied voltage (i.e., the voltage across the switch in that phase derived from the alternating voltage source). Once conductive, this thyristor provides a path for fault current during the half cycle it is forward biased. This action could limit the effectiveness of the switch as a current-limiting device.

Accordingly, it is an object of my invention to provide means for precluding actuation of any commutating circuits not initially actuated at the beginning of the commutation process.

It is a further object of my invention to provide, in a current-limiting static switch including commutation means selectively operative for interrupting a fault current in the switch in response to a "Stop" signal, novel means to ensure that said stop signal is rapidly terminated once commutation of the selected commutation circuits has begun.

SUMMARY OF THE INVENTION

In a current-limiting static switch connected between a three-phase alternating voltage source and a load in a high current electric power system, means are provided for directing commutation. The static switch comprises three pairs of inverse parallel power thyristors each of which is shunted by a separate commutation circuit. Each commutation circuit includes a charged capacitor and a normally nonconductive thyristor which is triggered in response to a "Stop" signal from an overcurrent detecting circuit. The "Stop" signal is initiated whenever current through the switch attains a preselected trip level.

A polarity detecting means is provided in each phase of the switch monitoring the current flowing therethrough and providing signals indicative of its direction. These signals are used to control means for directing the stop signal from the overcurrent detecting means to the triggering means of the commutation circuit shunting the conducting power thyristor and for preventing the "Stop" signal from operating the other triggering means.

In accordance with my invention, means are provided to ensure that the "Stop" signal is terminated upon the initiation of commutation in the switch. The means shown is coupled to the commutation control circuit and is operative to terminate the "Stop" signal quickly after its initiation.

BRIEF DESCRIPTION OF THE DRAWINGS

This invention will be better understood and its various objects and advantages will be more fully appreciated from the following description taken in conjunction with the accompanying drawings in which.

DETAILED DESCRIPTION OF THE PREFERRED EMBODIMENT OF THE INVENTION

Figure 1:
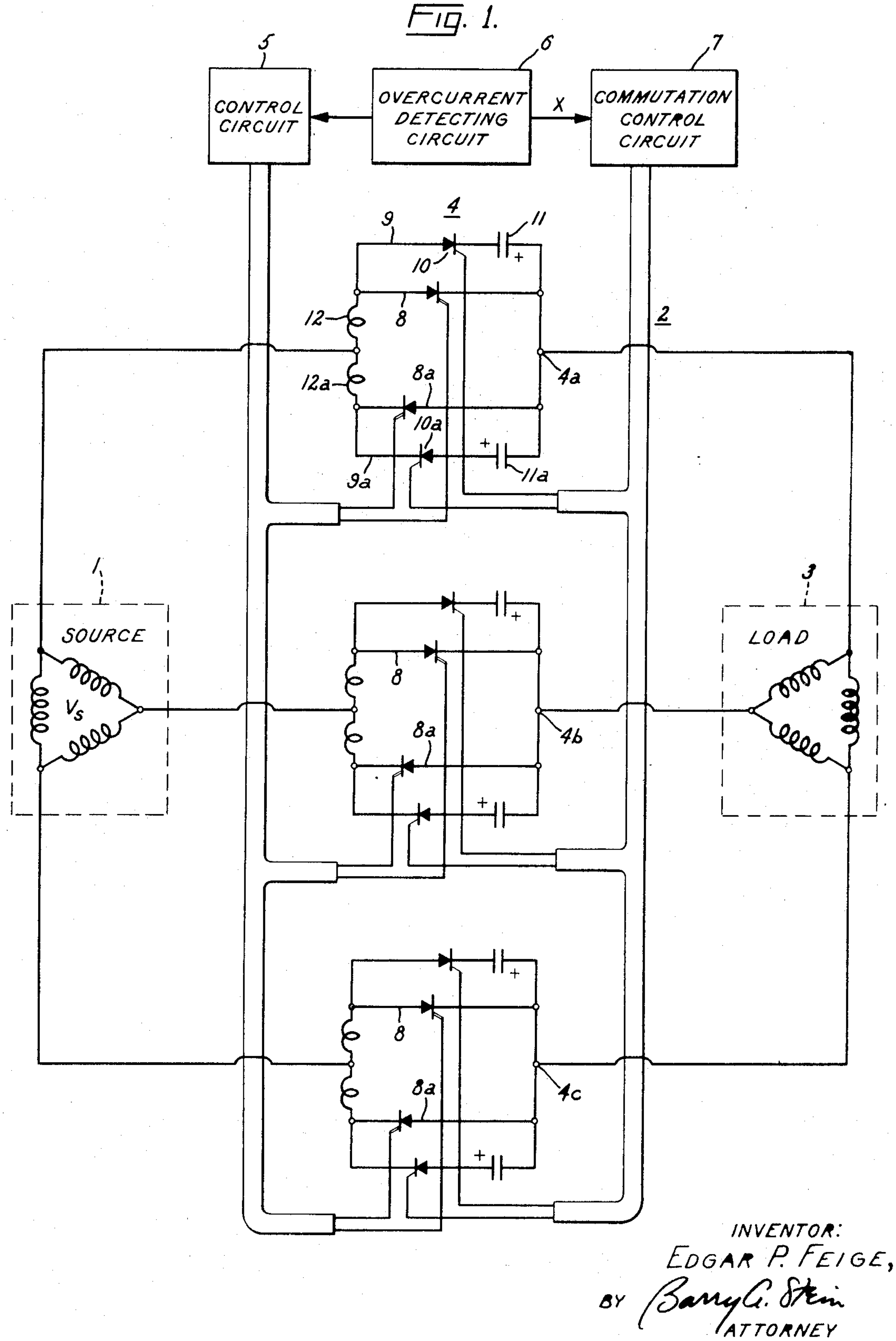
FIG. 1 is a schematic diagram of the static switch utilizing my invention.

As can be seen in the FIG. 1, a three-phase alternating voltage source 1 is arranged to supply electric power to a load 3. In order to initiate or to terminate the flow of current to the load, a static circuit breaker is provided between the source and the load. This circuit breaker is denoted as the static system protector 2 in that it includes a solid-state or static switch 4.

In order to control conduction of the static switch, i.e., initiate or terminate current conduction therein, the static system protector also includes a control circuit 5 having two states or modes, namely "ON" and "OFF." When control circuit 5 is actuated from its ON to its OFF states the static switch interrupts the flow of current to the load. Further, the static system protector includes commutation means to force commutate the static switch in high-speed response to detection of a fault current by overcurrent detecting circuit 6. The commutation means are controlled by commutation control circuit 7.

The static switch 4 comprises one thyristor switch for each phase of the power system, namely **4*a*, 4*b* and 4*c*. In order to provide for bidirectional load current conduction, each of the phase switches comprise a pair of SCR's connected in inverse parallel relationship with one another to form unidirectional conducting power legs 8 and 8*a***.

The power SCR's in legs 8 and **8*a*** are shown as having a double gate electrode in order to symbolically represent that each leg may consist of a parallel array of similarily poled high-power SCR elements. The number of elements utilized in each leg depends on the desired current handling capability of the switch. Of course it is to be understood that the legs may each comprise only a single power SCR element, if such is desired. To form a higher voltage switch, additional SCR's can be respectively connected in series with those shown, if desired.

Control circuit 5, in its "ON" mode, provides suitable gate signals to the power SCRS making up switch 4 to render the switch conductive, whereupon load current is able to flow between the source 1 and the load 3. In its "OFF" mode no gate signals are provided by control circuit 6 to any of the switch power SCRS. Hence, when control circuit 6 is in this mode the static switch 4 blocks the flow of load current.

Each phase switch of the static system protector is equipped with means for rapidly forcing all conducting power SCRS off in response to a sensed fault in that phase. In phase one that means includes a pair of commutation circuits 9 and **9*a*, connected in shunt across respective SCR legs 8 and 8*a*. Commutation circuit 9 comprises a normally nonconductive commutating thyristor 10 and a serially connected commutating capacitor 11. Commutation circuit 9*a* comprises a normally nonconductive commutating thyristor 10*a* and a serially connected commutating capacitor 11*a*. Each capacitor is charged to a DC voltage level, the polarity of which is as shown. Although not shown in FIG. 1, a precharging scheme such as that claimed in U.S. Pat. No. 3,098,949—Goldberg is contemplated. Once charged the capacitor is available to commutate its associated power thyristor when called upon to do so. A decoupling inductor 12 is connected in series with power leg 8 while a decoupling inductor 12*a* is connected in series with power leg 8*a*** to aid in commutation.

When a fault occurs, current flowing in the switch increases abnormally. When the magnitude of fault current in any phase attains a preselected level, overcurrent detecting circuit 6 is activated and immediately provides a "Stop" signal to the control circuit 5 and to the commutation control circuit 7. Upon receipt of a stop signal, control circuit 5 ceases producing gate signals for the power SCR's. In response to the same event, control circuit 7 is arranged to supply a gate signal to the thyristor in the commutating circuit associated with the power SCR leg conducting the fault current in each phase. Once triggered the commutating thyristor conducts, whereupon its associated charged commutating capacitor begins discharging through the shunted power SCR leg in the reverse direction (i.e., cathode to anode) to quench conduction therein.

The above-described sequence of events can occur very quickly after a fault of preselected magnitude is sensed. Therefore, the fault current which is permitted to flow can be limited to an acceptable magnitude, (i.e., well below the available peak fault current magnitude) by virtue of the rapid response of the static system protector.

Figure 2:
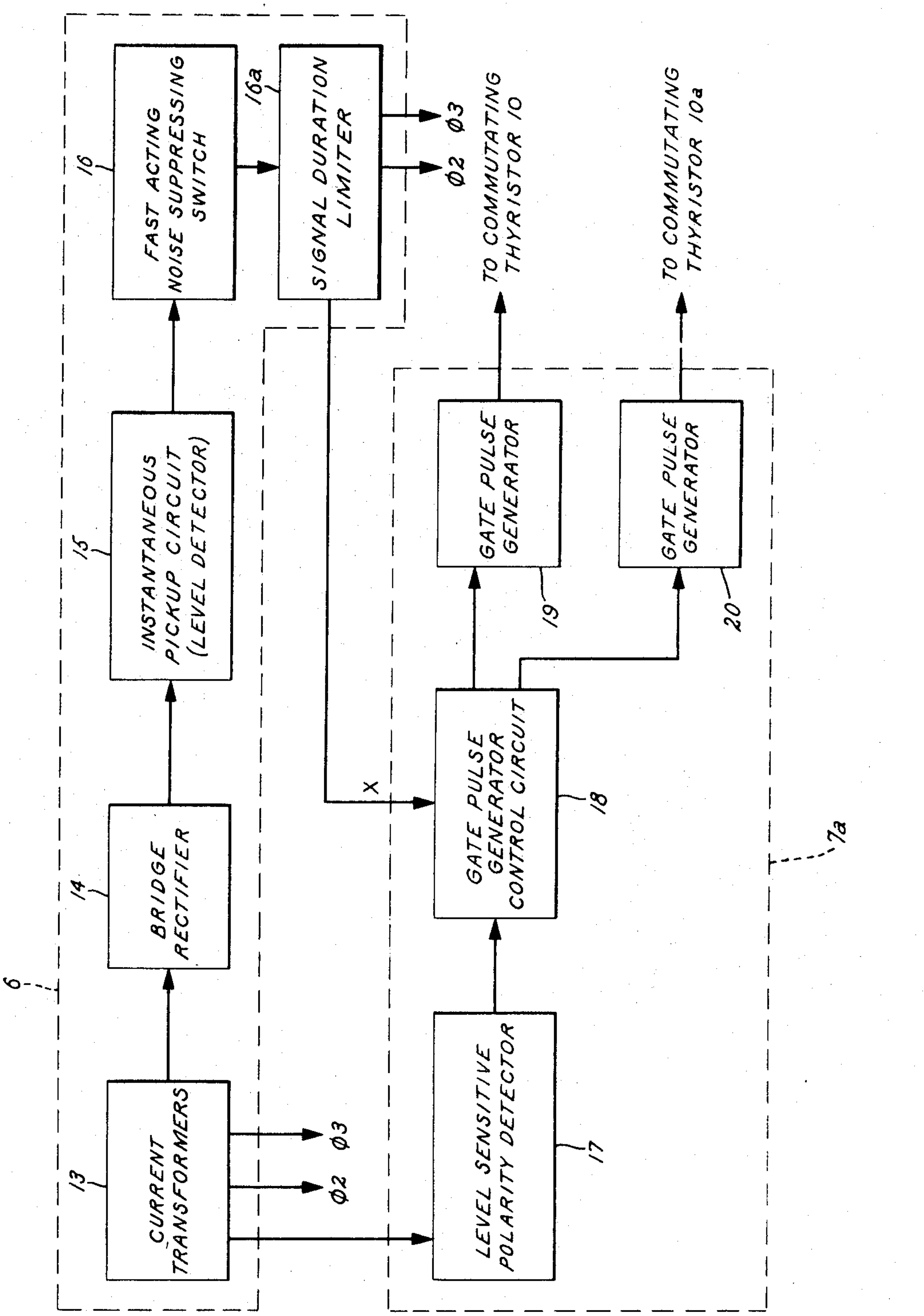
FIG. 2 is a functional block diagram of the overcurrent detecting means and the means to control commutation in the switch.
Figure 3:
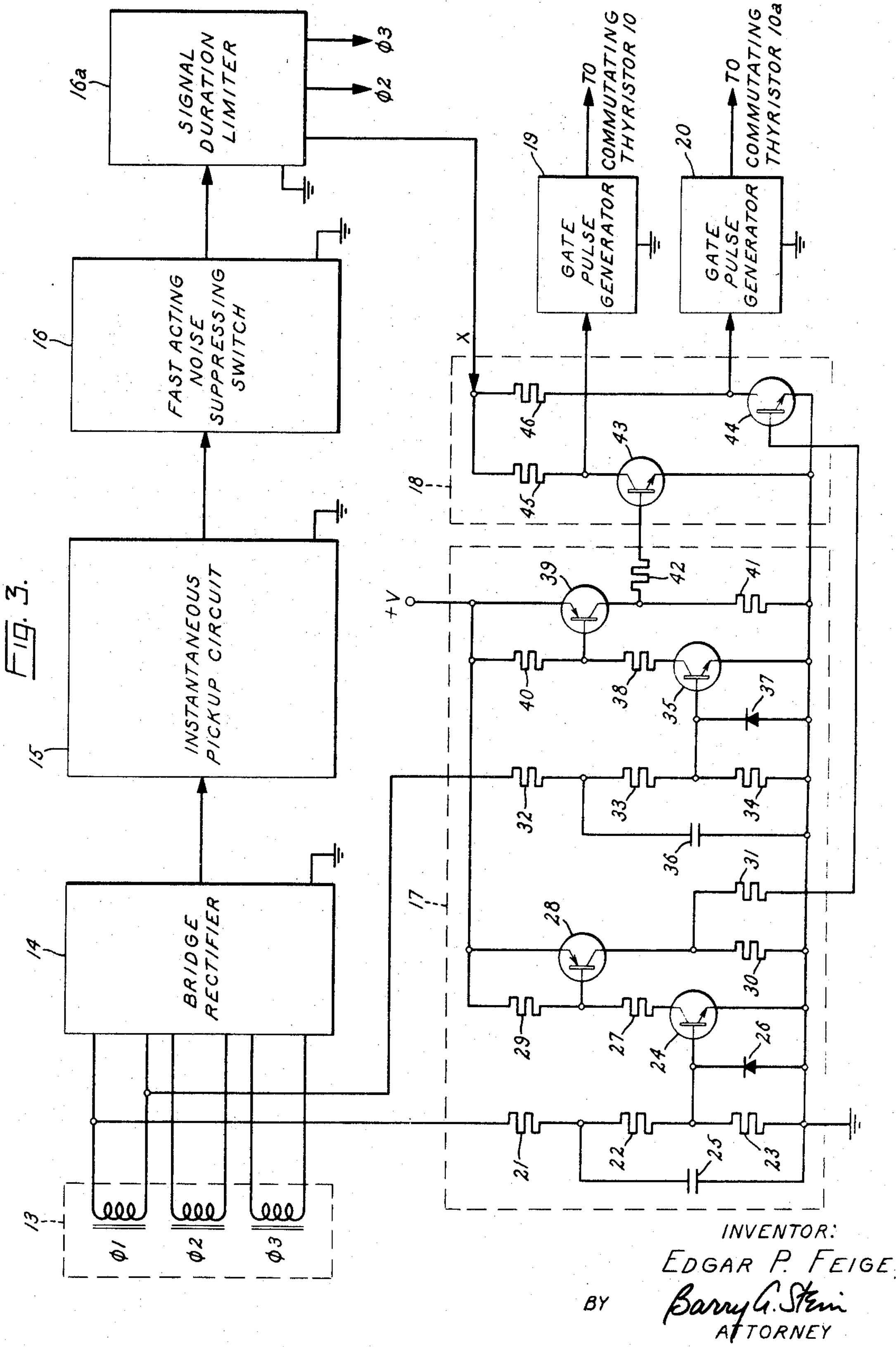
FIG. 3 is a more detailed schematic-functional block diagram of that shown in FIG. 2.

A more detailed showing of the overcurrent detecting circuit and part of commutation control circuit 7 of static system protector is found in the functional block diagram of FIG. 2 and the schematic diagram of FIG. 3.

As can be seen from FIG. 2 overcurrent detecting circuit 6 comprises current transformers 13 for monitoring the current flow between source 1 and load 3, a bridge rectifier 14, an instantaneous pickup circuit 15, a fast acting noise suppressing switch 16, and a signal duration limiter 16*a*. The function of detecting circuit 6 is to provide a commutation initiating signal whenever the instantaneous magnitude of the current in any phase of the switch 4 attains a preselected value. This value is the trip level of the circuit breaker 2 and is adjustable.

Bridge rectifier 14 serves to rectify the signals from the current transformers to provide a signal indicative of the highest magnitude of load current flowing through the switch. In the event of a short circuit (fault) in the load circuit to which the circuit breaker 2 is connected, the magnitude of the latter signal will rise to the preselected trip level, whereupon the pickup circuit 15 is operative and provides a signal to the fast-acting noise suppressing switch 16. Thereafter the pickup circuit 15 tends to remain operative so long as fault current remains above its dropout or reset level, which may be the same as or lower than the trip level. The noise suppressing switch is adapted to filter spurious noise and to supply a DC voltage to signal duration limiter 16*a* in rapid response to the signal from the pickup circuit 15. Limiter 16*a* is adapted for providing a short duration stop signal X to commutation control circuit 7 in rapid response to the voltage from switch 16.

Commutation control circuit 7 includes an individual control circuit for controlling commutation in each phase of the switch. In FIG. 2 the individual commutation control circuit, denoted as 7*a*, is shown. This circuit controls commutation in phase one. Similar individual commutation control circuits are provided for phases two and three.

The function of circuit 7*a* is to determine which power leg (i.e., 8 or 8*a*) of phase one is conducting load current and to preclude the commutating thyristor shunting of nonconducting leg from being triggered. Thus, if a fault current above the trip level is in existence in phase one, only the commutating thyristor shunting the leg conducting that current will be triggered into conduction to commutate the leg off and thereby interrupt the fault current.

Circuit 7*a* comprises a level sensitivity polarity detector 17, a gate pulse generator control circuit 18, a gate pulse generator 19 for commutating thyristor 10 and a gate pulse generator 20 for commutating thyristor 10*a*.

The polarity detector 17 receives as its input an unrectified signal from the secondary of the current transformer monitoring phase 1. When the input signal is of positive polarity (i.e., the dotted end of the secondary is positive) and above a certain threshold level, the detector 17 applies signals to gate pulse generator control circuit 18. Upon receipt of these signals circuit 18 acts to disable gate pulse generator 20 (the one associated with commutating thyristor 10*a*) from being actuated in response to a "Stop" signal while enabling gate pulse generator 19 to be actuated in response to such a signal. Similarly, when the input signal is of the negative polarity (i.e., the undotted end of the secondary is positive) and above the detectors' threshold level, the signals applied to circuit 18 cause it to disable generator 19 from being actuated while enabling generator 20 to be actuated in response to a "Stop" signal.

Whenever the current flowing through phase one is below the threshold level of polarity detector 17, the detector is unable to determine its direction and neither gate pulse generator is disabled. The threshold level of polarity detector 17 is made sufficiently low so that the decoupling inductors that are connected in the power legs are effective to ensure successful commutation of this amount of current even though both commutating circuits are concurrently triggered.

In a three-phase switch, like that shown in FIG. 1, a fault current may sometimes flow simultaneously through all of the phases with its magnitude in one phase being sufficiently high to cause operation of the pickup circuit 15 while its magnitude in a second phase is below the threshold level of the polarity detector. In such an event neither gate pulse generator for that second phase is disabled, but the decoupling inductors provided therein ensure proper commutation.

The circuit details of polarity detector 17 are shown in FIG. 3. This detector is seen to comprise a pair of identical circuits. One circuit has its input coupled to the dotted end of the phase one secondary of transformer 13. The other circuit has its input coupled to the undotted end of that secondary.

The input from the dotted end of the secondary is fed via biasing resistors 21, 22 and 23 to the base of transistor 24. Capacitor 25 is provided as a noise suppressing filter. A polarity insuring diode 26 is connected between the base of transistor 24 and its grounded emitter. The collector of transistor 24 is connected via resistor 27 to the base of transistor 28. Resistor 29 is connected between base of transistor 28 and its emitter. The emitter of transistor 28 is also connected to a positive direct voltage point V. The collector of transistor 28 is connected to ground via resistor 30. The output of transistor 28 is fed from its collector, via resistor 31, as an input to gate pulse generator control circuit 18.

The input from the undotted end of the secondary is fed via biasing resistors 32, 33 and 34 to the base of transistor 35. Capacitor 36 is provided as a noise suppressing filter. A polarity insuring diode 37 is connected between the base of transistor 35 and its grounded emitter. The collector of transistor 35 is connected via resistor 36 to the base of transistor 39. Resistor 40 is connected between the base of transistor 39 and its emitter. The emitter of transistor 39 is connected to positive direct voltage point V. The collector of transistor 39 is connected to ground via resistor 41. The output of transistor 39 is fed from its collector, via resistor 42 as an input to gate pulse generator control circuit 18.

Gate pulse generator control circuit 18 comprises a pair of transistors 43 and 44. The base of transistor 43 is connected to resistor 42 of the polarity detector and the base of transistor 44 is connected to resistor 31 of the polarity detector. The emitters of both transistors 43 and 44 are connected to ground. The collector of transistor 43 is connected, via current-limiting resistor 45, to the output of fast-acting noise suppressing switch 16 while the collector of transistor 44 is also connected, via current-limiting resistor 46 to the output of that switch. The collector of transistor 43 is connected to the input of gate pulse generator 19 while the collector of transistor 44 is connected to the input of gate pulse generator 20. Both of the gate pulse generators are operative to supply a trigger signal to their associated commutating thyristor upon receipt of a positive voltage "Stop" signal, but are unable to supply the trigger signal when their input is at ground potential.

The following is a detailed description of the operation of the circuitry shown in FIG. 3. For the sake of an example, it shall be assumed that a fault current begins to flow through leg 10 as soon as that leg begins conducting (when the dotted end of the phase one secondary of transformer 13 is positive). When the current flowing therethrough builds up to a predetermined magnitude the bias or conduction point of transistor 24 is reached. The bias point of transistor 24 is a function of the values of resistors 21, 22 and 23 and defines the threshold level below which detector 17 can not discriminate current direction. This threshold level is well below the trip level of the overcurrent detector 15. Once transistor 24 conducts, the emitter-to-base junction of transistor 28 becomes forward biased which turns that transistor on. When transistor 28 begins conducting its collector is raised from ground potential to the potential of positive voltage point V. This potential signal is fed via resistor 31 to the base of transistor 44.

At the time that the dotted end of the secondary is positive, transistor 35, coupled to the undotted end of the secondary, will be off since there is no forward bias for its base-to-emitter junction. When transistor 35 is off, the emitter-to-base junction of transistor 39 is not forward biased and therefore that transistor will be off, with its collector at ground potential. Accordingly, the base of transistor 43 will be at ground potential.

Once the rectified signal from bridge 14 reaches the preselected trip level of circuit 15, the fast acting switch 16 supplies a direct voltage to limiter 16*a* which in turn provides short duration "Stop" signal X via resistors 45 and 46 to the collectors of the respective transistors 43 and 44.

Since the base of transistor 43 is at ground potential it is unable to conduct and the positive signal X is therefore directed as an input to pulse generator 19. Upon receipt of input voltage X, generator 19 triggers the commutating thyristor 10 into conduction. Transistor 44 on the other hand is rendered conductive by the positive potential provided to its base via resistor 31. Therefore, its collector will drop to ground potential and the positive stop signal will be shunted away from the input of gate pulse generator 20 thereby precluding it from triggering thyristor 10*a*. Once thyristor 10 is triggered into conduction and thyristor 10*a* is not, the energy stored in capacitor 11 is released in the reverse direction through conducting leg 8 to rapidly interrupt the fault current therein.

It is to be understood that if a three-phase fault exists, the respective individual commutation control circuits for phase two and phase three will operate in the same manner as commutation control circuit 7*a*, so as to insure successful interruption of the fault current flowing in their respective phases.

In some situations involving three-phase faults it is possible that, a short time after the initiation of commutation in all of the phases of the switch, the current in one phase may fall below the threshold level of its polarity detector while there is still sufficient fault current flowing through the other two phases to cause operation of pickup circuit 15. By way of example, assume that commutation commenced when the fault current was flowing through leg 8 of switch 4*a* (phase one), leg 8*a* of switch 4*b* (phase two) and leg 8 of switch 4*c* (phase three) and that a short time thereafter the magnitude of current in phase two, although being diverted from leg 8*a* by the discharging commutating capacitor in parallel therewith, is still above the trip level of circuit 15 while the magnitude of current in phase one is below the threshold level of its polarity detector 17.

In such a situation if a Stop signal were to exist at that later time, as a result of the current in phase 2 being above the trip level, gate pulse generator control circuit 18 would direct that Stop signal to gate pulse generators 19 and 20. The result of this action would be that previously untriggered commutation thyristor 10*a* would be triggered into conduction by gate pulse generator 20 as soon as it become forward biased, i.e., when the alternating voltage, derived from the source and appearing across the switch, reversed, whereupon the fault current would be enabled to flow through it for the entire half cycle it is forward biased.

In accordance with my invention, I preclude the above-described situation from occurring by providing means to ensure that the "Stop" signal exists for only a relatively short duration so that, once given, it terminates rapidly and remains off at least until fault current conduction in all phases ceases. In so doing, the "Stop" signal will not exist long enough to be directed to the gate pulse generator of the commutating thyristor in the commutation circuit shunting the nonconducting power thyristor leg once commutation by the inversely connected commutation circuit has begun.

The means used to accomplish this function may take numerous forms, as will be apparent to those skilled in the art. As shown in FIGS. 2 and 3, such means is denoted as a signal duration limiter 16*a*. This means is connected to the output of noise suppressing switch 16 and is operative for reducing the duration of the signal produced thereby to a relatively short duration stop signal X (e.g., the duration of X being less than one millisecond). For example, limiter 16 may consist of a capacitor connected between switch 16 and control 18 to pass only a short duration stop signal. Further, the fast-acting noise suppressing switch 16 may be constructed to provide the short duration stop signal itself, without need for a separate duration limiter. This may be accomplished, for example, by placing a capacitor between its input and pickup circuit 15. Further, I also contemplate the use of a lockout device to terminate the stop signal in response to means for sensing the initiation of commutation in any phase of the switch.

While I have shown and described a particular embodiment of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim and desire to secure by Letters Patent of the United States is:

1. In a three-phase electric power system including a thyristor switch comprising, in each phase of the system, a pair of power thyristors, the thyristors of each pair being connected in inverse parallel relationship with one another and being adapted to alternately conduct current between an alternating voltage source and a load, fault current detecting means for providing a "Stop" signal in response to the magnitude of current in any phase attain a preselected level, selectively triggerable commutation means respectively connected to said power thyristors and operative when triggered for interrupting the flow of current therein, polarity detecting means adapted for determining which of said power thyristors is conducting current in each phase and for providing control signals indicative thereof, and control means coupled to the polarity detecting means for triggering selected commutation means in response to said "Stop" signal and in accordance with the signals from the polarity detecting means, the improvement comprising: signal duration limiting means connected between the fault current detecting means and the control means for ensuring that said "Stop" signal, once provided, exists for only a relatively short duration.

2. In a three-phase electric power system including a thyristor switch comprising in each phase of the system a pair of power thyristors, the thyristor of each pair being connected in inverse parallel relationship with one another and being adapted to alternately conduct current between an alternating voltage source and a load, fault current detecting means for providing a "Stop" signal in response to the magnitude of current in any phase attaining a preselected level, selectively triggerable commutation means respectively connected to said power thyristors and operative when triggered for interrupting the flow of current therein, polarity detecting means adapted for determining which of said power thyristors is conducting current in each phase and for providing control signals indicative thereof, said polarity detecting means being responsive to the direction of current in each phase only when the magnitude exceeds a predetermined threshold level and control means coupled to the polarity detecting means for triggering selected commutation means in response to said Stop signal and in accordance with the signals from the polarity detecting means, the improvement comprising: means for ensuring that said Stop signal, once provided, exists for only a relatively short duration so that once the selected commutation circuits are triggered in response to the Stop signal, the unselected commutation circuits are prevented from being triggered thereafter.

3. In the power system as specified in claim 2 wherein said duration is shorter than 1 millisecond.

4. In the power system as specified in claim 2 wherein the last-mentioned means is a signal duration limiter connected between the fault current detecting means and the control means, said limiter being adapted for limiting the duration of the Stop signal from said fault current detecting means to a short duration signal.

5. In the power system specified in claim 4 wherein said short duration signal is less than 1 millisecond.

* * * * *